INVENTOR.
GLEN W. STODDARD
BY
ATTORNEY

July 14, 1959 G. W. STODDARD 2,894,787
FORAGE BLOWER
Filed Feb. 1, 1957 2 Sheets-Sheet 2

INVENTOR.
GLEN W. STODDARD
BY
ATTORNEY

United States Patent Office 2,894,787
Patented July 14, 1959

2,894,787

FORAGE BLOWER

Glen W. Stoddard, Reinbeck, Iowa

Application February 1, 1957, Serial No. 637,661

1 Claim. (Cl. 302—37)

This invention relates to blowers and, more particularly, to blowers for blowing forage into silos, barns, storage bins, and the like.

This application is a continuation in part of patent application, Serial No. 499,569, filed April 6, 1955.

Blowers made according to previous designs for blowing forage, especially dry forage such as chopped hay, into barns and the like emitted clouds of dust while in operation and were, therefore, unpleasant and unhealthful for the operator who used them. Further, these prior blowers were limited in the pressure which could be developed in them and, therefore, it was impossible to blow forage into some. For example, in silos which were of considerable height, the blowers according to prior inventions were unable to blow the silage into the tops of the silos and, therefore, the silos could not be completely filled.

The present invention contemplates the provision of a forage blower which will reduce the amount of dust which emanates from the front of the blower to the ambient atmosphere when dry chopped hay is being blown. A blower is also provided herein which will develop a higher pressure than that of previous blowers.

In carrying out the invention, an adjustable support for supporting the fan in the housing of the blower is provided whereby the fan can be moved laterally and vertically to adjust the clearance between the fan housing and the blade and, therefore, make it possible to have optimum clearance between the blower blades and the housing. Consequently, a higher pressure and a more efficient blower are provided. In order to cause the blower to allow less dust to escape from the front thereof, the blades are inclined at an angle to the shaft so that the blades will urge the air back toward the rear of the housing and, therefore, not allow the air to move outwardly, carrying dust and pieces of forage with it.

It is, accordingly, an object of this invention to provide a forage blower which is simple in construction, economical to manufacture, and simple and efficient in operation.

Another object of the invention is to provide a forage blower and adjustable fan which may be moved from side to side to provide optimum clearance.

A further object of this invention is to provide a forage blower wherein the blades thereof incline relative to the shaft to direct the air toward the rear of the casing.

A still further object of the invention is to provide an improved forage blower wherein the blades on the impeller thereof curve axially from rear to front in the direction of rotation of the blower impeller.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
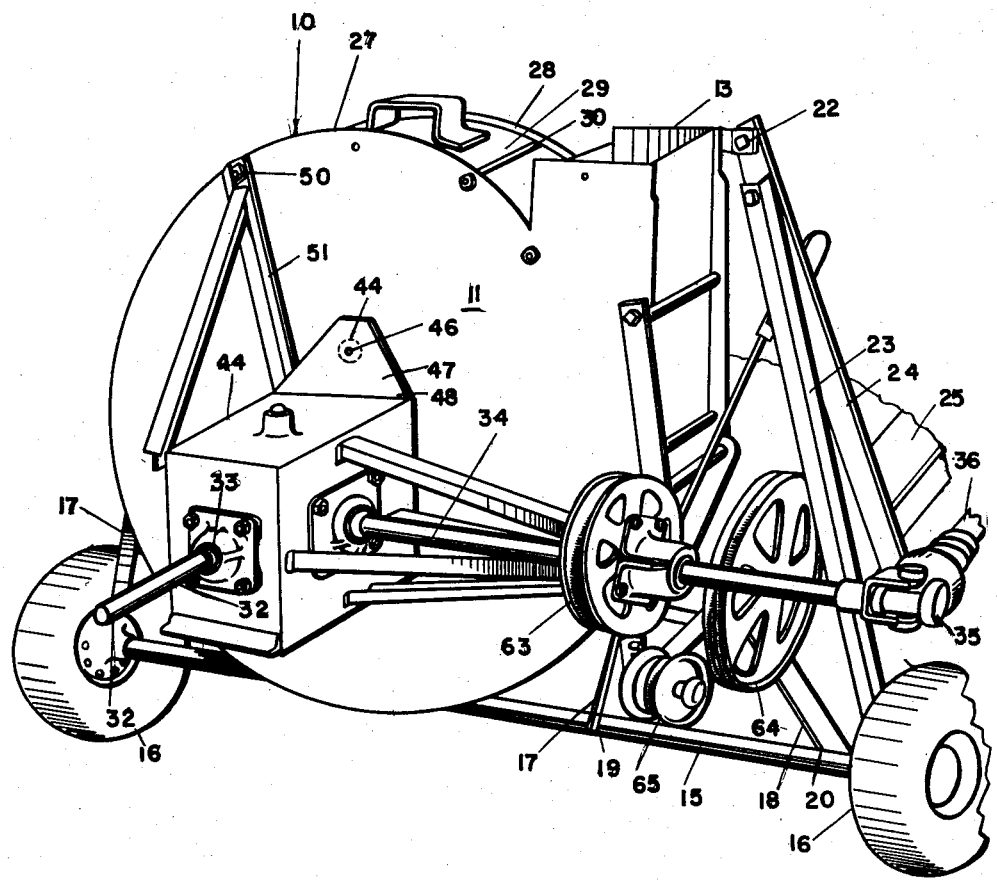
Fig. 1 is an isometric view of a machine according to the invention.
Figure 2:
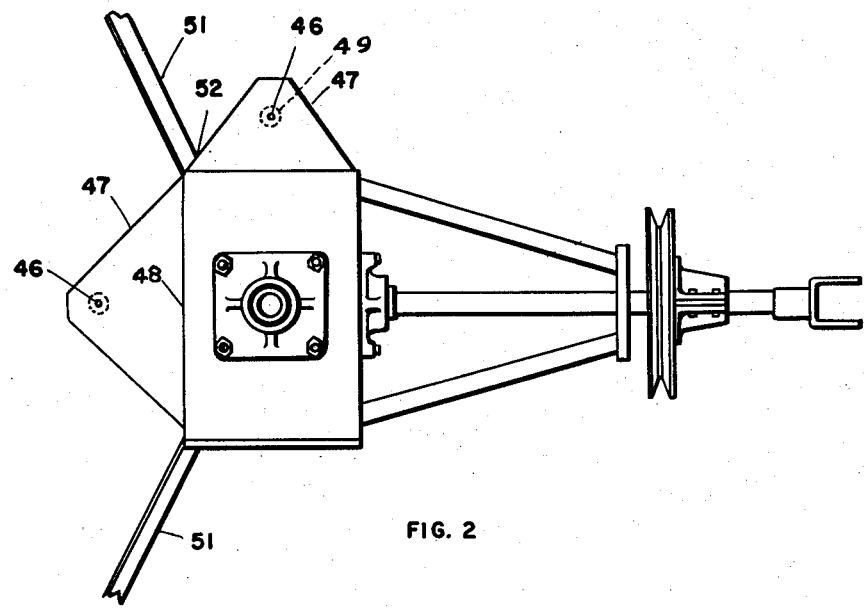
Fig. 2 is an enlarged view of the fan driving mechanism shown in Fig. 1.
Figure 3:
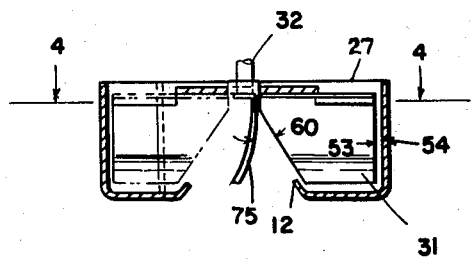
Fig. 3 is a cross sectional view taken on line 3–3 of Fig. 4.
Figure 4:
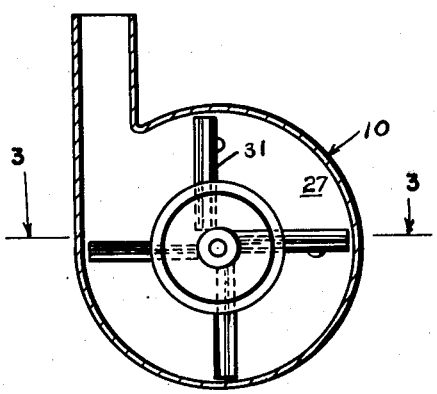
Fig. 4 is a cross sectional view taken on line 4–4 of Fig. 3.

Now with more specific reference to the drawings, a blower 10 is shown having a casing 11 with an inlet 12 for drawing in air and forage and a discharge opening 13 which may be connected to a suitable conveyor pipe or the like.

The blower 10 is carried on a truck made up of an axle 15 having wheels 16 on each end thereof. The axle 15 is attached to the casing 11 by means of braces 17 and 18 which are attached to the axle 15 at 19 and 20, respectively, and the upper ends are attached to the casing 11. Other lateral braces 23 are attached to the axle 15 at the lower end thereof and are attached to the lower portion of the casing 11 at 22.

The blower 10 will have a usual suitable conveyor 25 attached to the front thereof for conveying forage from a transporting vehicle to the blower 10. The blower casing 11 is made up of a rear plate 27 and a front plate 28 having a cylindrical shaped plate 29 supported therebetween. The front and rear plates 28 and 27 are held together and clamped to the plate 29 by means of bolts 30.

The casing 11 has an impeller 31 rotatably supported thereon on a shaft 32. The shaft 32 is carried in bearings 33 in a gear case 44. The gear case 44 has suitable bevelled gears or the like for connecting the drive shaft 32 to the impeller 31, one bevelled gear being attached to the shaft 32 and the other to a shaft 34. The shaft 34 is connected to a universal joint connection 35 and to a shaft 36. The shaft 36 may be attached to a tractor power take-off or other suitable prime mover for driving the impeller 31 and conveyor 25 of the blower 10.

The gear case 44 is connected to the casing 11 and is supported on the rear plate 27 by means of bolts on holes 46 in flange plates 47 which are attached to the gear case 44 at 48. The holes 46 in the flange plates 47 are substantially the size of the bolt which is to go through them. Holes 49 in the rear plate 27 are considerably larger than the bolts they receive so that when the bolts in the holes 46 and 49 are loosened, the gear case 44 can be adjusted from side to side and upwardly. Likewise, the holes in the plate 27 through which the bolts 30 extend are oversized so that these bolts can be adjusted with braces 51 which are attached to the gear case 44 at 52 and moved therewith. Therefore, by adjusting the position of the gear case 44, the clearance between impeller blade edge 53 and inside edge 54 of the casing 11 can be adjusted.

The blades of the impeller 31 are shown inclined at an angle 60 of approximately ten degrees to the axis of the shaft 32. The blades are also curved axially at 75 in the direction of rotation and away from the rear of the blower 10 to further prevent the escape of air entrained dust from the front of the blower 10. This inclination of the blades causes the impeller 31 to draw the air toward the back of the blower casing 11 and, therefore, allows less dust to escape from the inlet 12 and thus materially reduces the unpleasant results to the users of the machine.

A pulley 63 is attached to a shaft 24 and rotates therewith and is adapted to have a belt therearound to drive a conveyor pulley 64, the belt being extended around belt tighteners 65.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A forage blower comprising a generally cylindrical casing having a discharge opening in the side thereof and an inlet in one end, conveyor means for conveying forage to said inlet, an impeller supported inside said cylindrical casing and having a first shaft extending from one side thereof generally perpendicular to the central axis of said cylindrical casing, a gear box supported on one end of said casing, said gear box having a second shaft extending through said casing and supporting said impeller, driving means for attaching a driving member to said gear box, means in said gear box operatively connecting said driving means to said second shaft, plate means on said gear box engaging the rear wall of said casing, holes in said plate means registering with holes in said rear wall of said casing, and bolts extending through said holes in said plate means and said casing locking said gear box to said casing, said holes in said rear wall of said casing being considerably larger than said bolts extending through said holes in said plate means whereby said gear box can be adjusted relative to the central axis of said cylindrical casing and the clearance between the impeller blades at the side thereof can be adjusted, said impeller having blades extending radially from the axis thereof, said blades being plate shaped and being inclined in the direction of said first shaft at an angle of approximately ten degrees to the central axis of said first shaft whereby said impeller blades urge forage toward said rear wall of said casing.

References Cited in the file of this patent

UNITED STATES PATENTS

| | | |
|---|---|---|
| 1,477,469 | Wallace | Dec. 11, 1923 |
| 1,604,448 | Hosch | Oct. 26, 1926 |
| 2,343,714 | Swenson | Mar. 7, 1944 |
| 2,532,064 | Huddle | Nov. 28, 1950 |
| 2,591,411 | Delsman | Apr. 1, 1952 |
| 2,739,846 | Jacobson | Mar. 27, 1956 |